Figure 1:
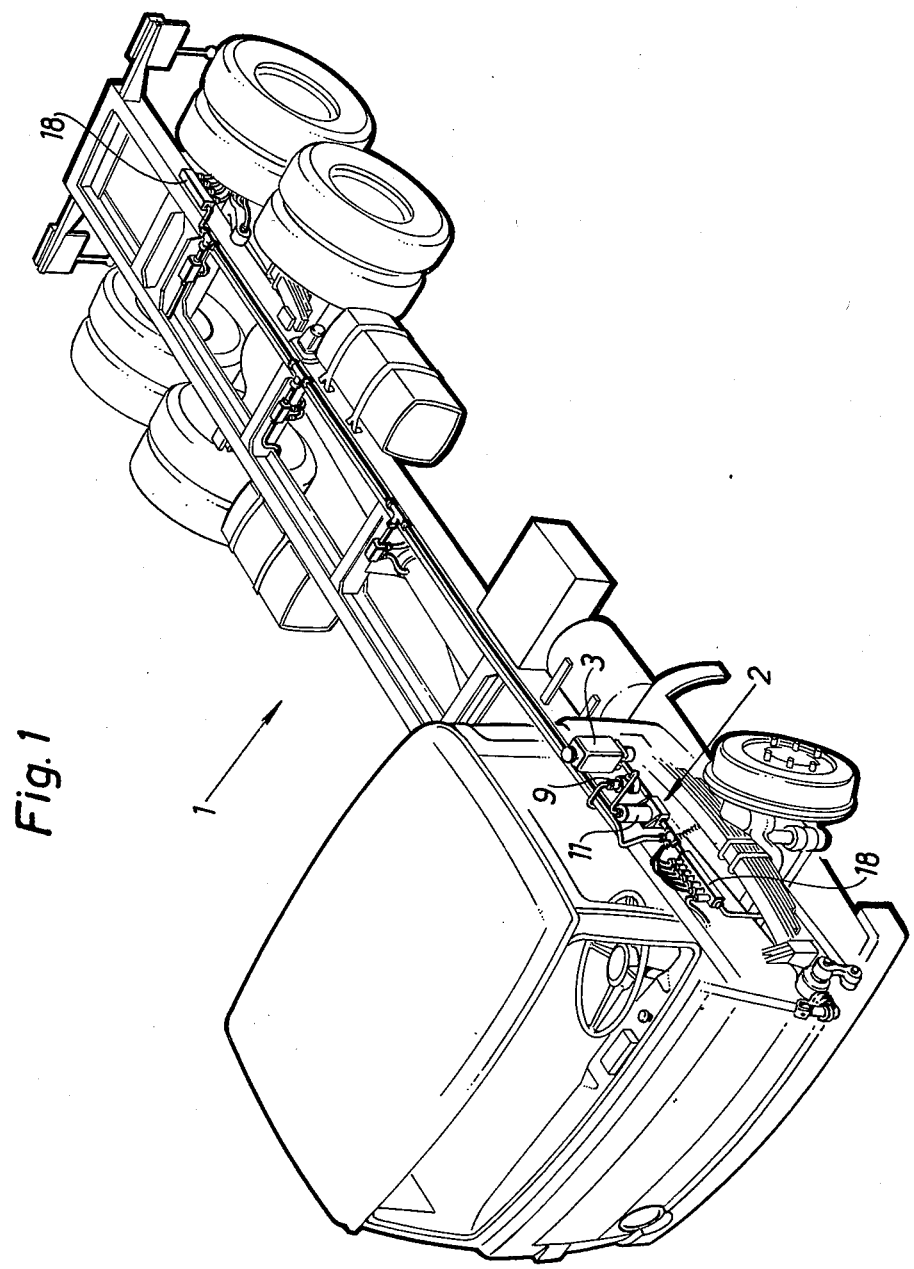

United States Patent [19]
Hedlund et al.

[11] 3,985,205
[45] Oct. 12, 1976

[54] LUBRICATING SYSTEM

[75] Inventors: Bo Pauls Sigvald Hedlund; Magnus Adolf Wilhelm Peter Jüllig, both of Atvidaberg, Sweden

[73] Assignee: AB ASSA, Atvidaberg, Sweden

[22] Filed: Jan. 8, 1975

[21] Appl. No.: 539,531

[52] U.S. Cl. .............................. 184/1 E; 184/1 C; 184/6.4; 184/7 D
[51] Int. Cl.² .......................................... F01M 1/00
[58] Field of Search .......... 184/1 C, 6.4, 7 R, 7 CR, 184/7 D, 7 E, 1 E, 6.3; 116/58 A, 36; 123/196

[56] References Cited
UNITED STATES PATENTS

| | | | |
|---|---|---|---|
| 3,561,565 | 2/1971 | Woor | 184/7 D |
| 3,618,709 | 11/1971 | Boelkins | 184/6.4 |
| 3,656,140 | 4/1972 | Gruber | 184/6.4 |
| 3,663,831 | 5/1972 | Cook | 184/6.4 |

*Primary Examiner*—Richard C. Pinkham
*Assistant Examiner*—Marvin Siskind
*Attorney, Agent, or Firm*—Bell, Seltzer, Park & Gibson

[57] ABSTRACT

An automatic vehicle lubrication system in which a counter counts whenever the ignition of the vehicle is switched on and the hand-brake is released. When the counter indicates a predetermined period of time has elapsed compressed air is allowed to actuate a pressure amplifying pump to pump lubricant to lubrication points. The counter is then reset.

19 Claims, 3 Drawing Figures

LUBRICATING SYSTEM

The present invention relates to an automatic lubricating system for a vehicle, and the invention relates especially to a system for periodically lubricating a vehicle such as a truck or the like.

Automatic systems for lubricating vehicles with lubricants such as grease or oil have been developed wherein quantities of the lubricant have been distributed from a central supply source to the different places where lubrication is required, such as for example the steering links, and the wheel suspension or wheel mounting assembly. The lubricant is distributed periodically depending upon the distance travelled by the vehicle as measured by the odometer of the vehicle.

Prior proposed lubricant distribution systems of the above type suffer from several disadvantages. One of said disadvantages is that a heavy duty truck which is to be driven only for example on a building site or other construction site is not lubricated sufficiently by such a lubricant distribution system since the distance driven by such a truck is normally very short, in relation to the distance driven by a long distance haulage vehicle driven on roads or motorways at relatively high speeds. Another of the disadvantages of the prior proposed systems is that in utilising such prior proposed systems it has not been possible to adjust the volume of the lubricant supplied to the different lubricating points in accordance with the specific requirements of each lubricating point since in prior proposed systems the same type of valve has been used for each lubricating point.

It is an object of this invention to provide a method for automatically applying a lubricant to lubrication points of a vehicle when the vehicle has operated for a predetermined period of time.

It is another object of this invention to provide an automatic lubrication apparatus for automatically lubricating a vehicle at the termination of a predetermined period of time during which the vehicle operates.

It is another object of this invention to provide an automatic lubricating system in which an accurately metered quantity of lubricant is supplied to lubrication points of a vehicle.

According to one aspect of this invention there is provided a method for periodically automatically applying a lubricant to lubrication points of a vehicle comprising the steps of supplying electrical power and electrical signals to a control unit when predetermined equipment in the vehicle is actuated, operating a counter unit of the control unit when electrical power and electrical signals are supplied to said control unit to measure predetermined intervals of time during which the vehicle is operating, and actuating a valve to cause lubricant to flow from a lubricant reservoir to said lubrication points at the end of predetermined intervals of time measured by the counter.

According to another aspect of this invention there is provided a lubrication system for periodically automatically applying a lubricant to lubrication points of a vehicle said system comprising a lubricant reservoir, means for guiding lubricant from said reservoir to said lubrication points, a valve for controlling the flow of lubricant and, a control unit comprising a counter unit, means for supplying electrical power and electrical signals to said control unit when predetermined equipment in the vehicle is actuated, the counter unit being connected to measure predetermined intervals of time during which the vehicle is operating, and means being provided to actuate said valve to cause lubricant to flow to said lubrication points at the end of said predetermined intervals of time.

According to a further aspect of this invention there is provided a vehicle provided with a lubrication system for periodically automatically applying a lubricant to lubrication points of the vehicle said system comprising a lubricant reservoir, means for guiding lubricant from said reservoir to said lubrication points, a valve for controlling the flow of lubricant and, a control unit comprising a counter unit, means for supplying electrical power and electrical signals to said control unit when predetermined equipment in the vehicle is actuated, the counter unit being connected to measure predetermined intervals of time during which the vehicle is operating, and means being provided to actuate said valve to cause lubricant to flow to said lubrication points at the end of said predetermined intervals of time.

Figure 2:
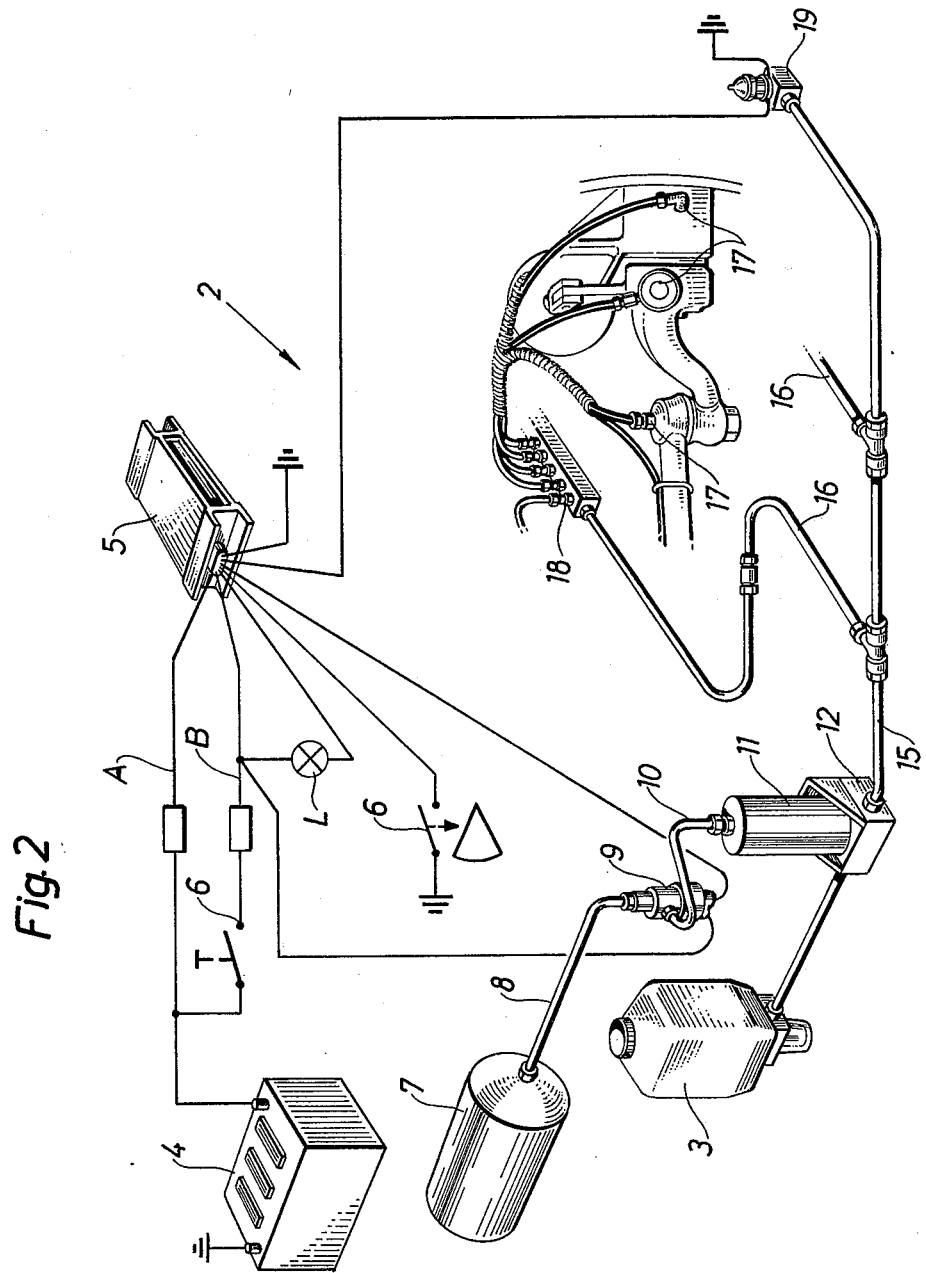
Figure 3:
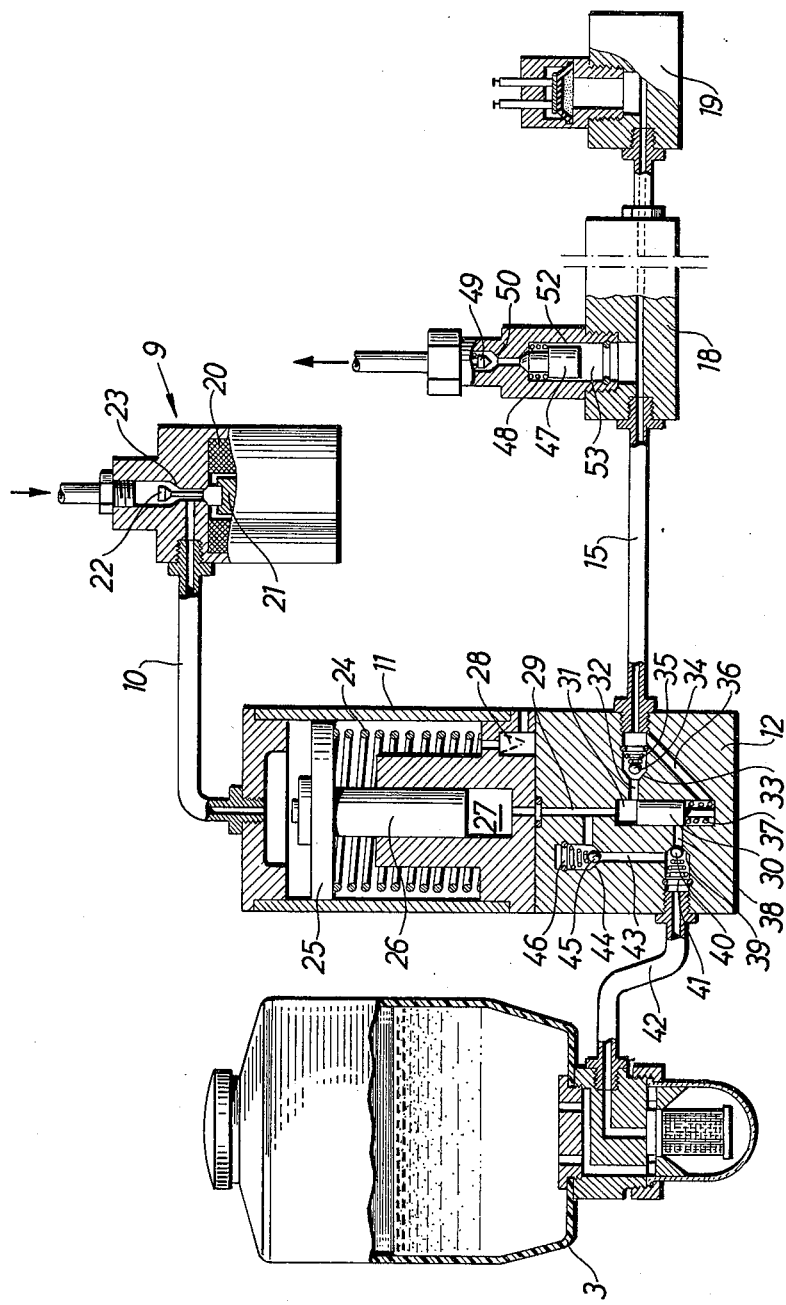

In order that the invention may be more readily understood, and so that further features thereof may be appreciated the invention will now be described by way of example with reference to the accompanying drawings in which FIG. 1 is a perspective view of a vehicle provided with an automatic lubricating system in accordance with the present invention, parts of the vehicle being cut away for reasons of clarity, FIG. 2 is a schematic view of the lubricating system provided on the vehicle illustrated in FIG. 1, individual elements of the system being illustrated interconnected to each other, and FIG. 3 is a side elevational part sectional schematic view of the lubricant reservoir and parts of the lubricating system provided on the vehicle shown in FIG. 1.

FIG. 1 is a perspective view of a vehicle 1 provided with an automatic lubricating system 2 in accordance with the present invention. The automatic lubricating system is designed to supply lubricant to lubricating points when the ignition of vehicle has been activated and the handbrake has been released for a predetermined period of time. At the expiry of the said predetermined period of time the automatic lubricating system is actuated to provide a "lubrication pulse" during which lubricant is urged towards the lubricating points. Another predetermined period of time then beings.

A lubricant reservoir 3 is mounted in a convenient place, and in the illustrated embodiment this reservoir 3 is a container for lubricating oil. The lubricant reservoir 3 is provided with an oil filtering unit at the bottom portion thereof. The system is powered by the ordinary 12 or 24V electrical power supply of the vehicle, and electrical power is fed from a power source such as battery 4 to one input of a control unit 5, and to another input of the unit 5 by line A via the ignition switch 6, and a second line B as shown in FIG. 2. An indicator lamp L is connected to the system.

In FIG. 2 the hand brake control 6 is indicated and as can be seen from FIG. 2, the hand brake control is associated with a switch which will complete an electrical circuit to the control unit 5 when the hand brake is released.

The control unit is the "brain" of the system and contains electrical circuitry constituting one memory unit, one counter unit, one pressure-monitoring unit and one actuating unit. The memory unit is continuously fed with power from the battery 4 by line A, and this memory unit section of the control unit is arranged to store signals representative of how much of the said predetermined period of time between the lubrication pulses has expired when the ignition of the vehicle is turned off. A light emitting diode emits a steady red light when the memory unit of the control unit is fed with the correct D.C. voltage. The counter unit comprises one "AND" gate connected so that when the ignition of the vehicle is activated and when the handbrake is released the "AND" gate is enabled and the counter operates. The counter is adapted to count at a steady rate and thus the count present on the counter is representative of the time elapsed since the beginning of the count. Whilst the counter is counting a further light emitting diode is activated to provide a flashing light. The said predetermined period of time can be preset to be any selected time between 10 minutes and 3 hours or longer. At the end of the period of time the control unit 5 transmits control pulses to a solenoid valve 9 incorporated in a compressed air tube 8, 10 extending from a compressed air tank 7 and to a pressure amplifying pump 11. The period of time during which the magnetic valve 9 is opened is called "the lubrication pulse." This period of time can be preset to be any time between 6 and 17 seconds for example.

The pressure monitoring unit of the control unit 5 receives signals from a pressure measuring device 19 included in the lubrication system. On the dashboard of the vehicle there is n indicator lamp L which is normally evenly illuminated. When a lubrication pulse occurs the lamp is switched off. When the pressure of lubricant in the lubrication system at the end of the lubrication pulse is above a certain predetermined pressure e.g. is at least 3 MPa (30 kp/cm$^2$), the indicator lamp is again illuminated with a steady light. If only a lower pressure is detected the lamp indicates an "incorrect function" by flashing. During each lubrication pulse compressed air is supplied from the ordinary compressed air tank 7 of the vehicle through supply line 8 to solenoid valve 9 which is actuated to open a passage from the air tank 7 through a further supply line 10 to a pressure amplifying pump 11. A valve unit 12 is associated with pump 11 and the valve unit 12 controls the supply of lubricant from a lubricant reservoir 3 and to a lubricant distribution line 15. The lubricant distribution line 15 is provided with various branches 16 leading to the different lubrication points 17 via lubricant metering units 18. A pressure measuring device 19 positioned at the end of the distribution line is of the electric type and is adapted to close an electric circuit associated with the control unit 5 when the pressure within line 15 reaches a certain predetermined minimum pressure, e.g. a pressure of at least 3 MPa (30 kp/cm$^2$). One terminal of the pressure measuring device 19 is connected to earth and the other one is connected to the control unit 5.

Referring to FIG. 3 in which various portions of the lubricating system are shown in more detail, some elements are shown in section in order clearly to indicate the internal structure thereof. The solenoid valve 9 is shown in its activated position with the solenoid coil 20 carrying a current, the core 21 thus being drawn to its raised, opening position so that compressed air can flow, as is indicated by the downwardly directed arrow in FIG. 3, and can pass through the passage between the valve head 22 and the valve seat 23 and can thus flow along the supply line 10 to the pressure amplifying pump 11. In the pressure amplifying pump 11 the compressed air acts against a piston 25 having a large surface area; the piston 25 is connected to a piston 26 having a small surface area which is provided in a lubricant containing cylinder 27, which piston 26 amplifies the pressure of the compressed air by a predetermined factor, the amplified pressure being applied to the lubricant. A spring 24 serves to reset the piston assembly 25, 26 to the initial, upper position when the solenoid valve 9 is closed and the air pressure applied to piston 25 is reduced. The space within the pump 11, in which the pistons and the spring are located, is vented through a filtered venting passage 28 which is provided with a filter to prevent dust from entering the space.

The valve unit 12 comprises a passage or channel 29, extending from cylinder 27 to a lower enlarged portion forming a cylinder 31 in which there is located a shuttle piston 30. To ensure correct functioning of piston 30 a bias spring 37 acts against the bottom side of the shuttle piston 30. Three valve assemblies are provided in the valve unit 12 as will now be described. A valve assembly 39 – 41 is provided between a lubricant inlet tube 42 and a passage 38 leading to the cylinder 31. The valve assembly comprises a valve seat 39 against which a valve ball 40 is biassed to a normally seated position by a spring 41. The second valve assembly is a check valve 44 – 46 provided in a passage 43 leading from the first valve assembly 39 – 41 to the passage 29 and comprising a valve seat 44, against which a valve ball 45 is biassed by a spring 46 into a normally seated position. The third valve assembly 33 – 35 is positioned in the oil distribution line in a passage 32 between the cylinder 31 and the lubricant distribution line 15 and comprises a valve seat 33, a valve ball 34 and a spring 35. This third valve assembly 33 – 35 is normally held in an open position for the admission of lubricant to the lubricating system but, in its closed position prevents the return flow of the lubricant from the lubrication oil distribution line. Thus valve assembly 33 – 35 forms a non return valve. A return flow passage 36 connects the lubricant distribution line 15 to the space under the shuttle piston 30 and to the first valve assembly 39 – 41 which permits the flow of lubricant therethrough during such a return flow.

The lubricant metering units 18 each comprise one or more lubricant receiving cylinders 53, in which a piston 47 is provided. The piston is biassed towards a lower rest position by a spring 48. Each individual cylinder 53 is sized to accommodate exact amount of lubricant required for the specific need of the lubrication point associated with the cylinder and hence, a very accurate lubrication is achieved at each lubrication point with only a predetermined amount of lubricant being supplied during each lubrication pulse. A non-return valve 49 is normally seated against a seat 50 in order to prevent return flow of lubricant from the lubrication point, lubricant being passed to each lubrication point through the valves 49 during each lubrication pulse as is indicated by the upwardly directed arrow in FIG. 3. The piston 47 is provided in the cylinder 53 in such a way that a small gap 52 is provided between the piston and the wall of the cylinder by reasons which are explained below.

The automatic lubricating system described above operates in the following way. When the ignition key is turned so that the ignition of the vehicle is actuated and the hand brake is released, which indicates that the vehicle is going to be driven, the counter section of the control unit 5 starts counting at an even rate. When the counter reaches a predetermined count, i.e., when the counter has counted for a predetermined period of time corresponding to the time which is to elapse between successive lubrication pulses, a signal is transmitted from the control unit 5 to the solenoid valve 9, which opens to permit air to flow from the air tank 7 to the pump 11 which is actuated to pump lubricant from the container 3 to the different points of the vehicle where lubrication is required. At the same time the counter unit is reset to zero. When the pressure in the lubricant supply lines has been built up to the value at which the pressure measuring device 19 is preset a signal is transmitted to the control unit 5 by the pressure measuring device 19 which indicates that the lubricating operation has correctly been completed.

Then, the above described cycle of operation is repeated.

When the solenoid valve 9 is activated high pressure air is admitted to the valve as shown by the downwardly directed arrow in FIG. 3 and the air acts upon the large area piston 25 to press said piston downwardly rapidly. The lubricant, which is present in the cylinder 27 and the connected passages is urged under a high pressure into the oil distribution system thereby urging the shuttle piston 30 downwardly. The piston 30 thus moves to open communication into the lubricant distribution line 15 via the valve passage 32 and valve assembly 33 – 35. The shuttle piston 30 at that moment closes the return flow passage and the lubricant can only pass outwardly into the lubricant distribution system and the high lubricant pressure will press the individual pistons 47 of the lubricant metering units 18 upwardly as illustrated in FIG. 3 to open the check valves 49. The predetermined amount of lubricant thus flows to each lubrication point, as is illustrated by the upwardly directed arrow in FIG. 3. When the predetermined amount of lubricant contained in the cylinder 53 has been urged to the lubricating point the piston 47 will seat against a valve seat 48. When all the lubricating pistons 47 have been pressed to their seating positions pressure will build up in the oil distribution system. This pressure will be transferred to the pressure measuring device 19 which, on sensing a predetermined pressure in the system signals to the control unit that the predetermined pressure has been reached and hence, that all the pistons 47 have operated and lubrication has been effected at all the lubrication points. Upon receipt of such a signal from the pressure measuring device the control unit 5 will approve the lubrication, which is visually indicated by the indicator lamp L. After the preset pump period the control unit will deactivate the solenoid valve 9 and the valve head 22 will seat against seat 23 and no more high pressure air will be admitted to pump 11. When valve head 22 engages with seat 23 a narrow air passage is opened extending from the end of supply line 10, downwardly past the valve spindle and past the upper end of the core 21. Thus high pressure air contained in line 10, and above piston 25 can escape. When no high pressure air is acting upon piston 25 the spring 24 will return the pistons 26 and 25 to their initial, upper position, whereby piston 26 sucks fresh lubricant from container 3 through the second valving assembly into cylinder 27. During this cylinder filling stroke of piston 25, 26 the piston 30 will be raised, thereby closing passage 32 so that no pressure from the lubricant distribution line 15 can act upon the valve unit other than through a return flow passage 36. The pressure build up in the lubricant distribution system will be released by the return passage 36 when activating pressure is not applied and, depending upon the actual pressures, the valve 39 – 41, by the force of the spring 41 thereof, permits a pressure balancing operation. The pressure in the oil distribution system will also close the third valve assembly 33 – 35 by urging the valve ball 34 to seat against valve seat 33. When no activating pressure is present in the lubricant distribution system the spring 48 of each individual distribution valve presses the piston 47 downwardly when the valve 49 has been closed and during this return movement of the piston 47 fresh lubricant in the cylinder 53 may pass through the gap 52 between the piston 47 and the wall of the cylinder 53 so that a new fresh charge of lubricant is received in the space above the piston 47 in the cylinder in the rest position of the piston 47. At that time the system is prepared for the next lubrication pulse with the cylinder 27 as well as the individual cylinders 53 filled with a fresh charge of lubricant. The pressure at which lubricant is applied to the lubrication points as well as the amounts of lubricant applied during each lubrication pulse can be predetermined and dimensions of the idividual passages and tubes as well as the spring forces of the individual springs can be selected in such a way that the desired lubricant pressures can be achieved and also adequate amounts of lubricant can be distributed to the individual lubrication points.

Numerous alterations of the structure herein disclosed will suggest themselves to those skilled in the art. However, it is to be understood that the present disclosure relates to a preferred embodiment of the invention which is for purposes of illustration only and is not be construed as a limitation of the invention.

What is claimed is:

1. A method of periodically automatically applying lubricant to lubrication points of an automotive vehicle comprising the steps of manually enabling and disabling movement of the vehicle while switching electrical circuits in response to such enabling and disabling and regardless of the occurrence of any such movement, measuring intervals of time during which vehicle movement is enabled, and delivering lubricant from a reservoir to lubrication points after measurement of a predetermined interval of time during movement of the vehicle was enabled regardless of the occurrence of any such movement.

2. A method according to claim 1 wherein the step of delivering lubricant comprises urging lubricant from the reservoir to the lubrication points by supplying high pressure air.

3. A method according to claim 1 wherein the step of manually enabling and disabling movement of the vehicle comprises actuating a vehicle handbrake.

4. A method according to claim 1 wherein the step of manually enabling and disabling movement of the vehicle comprises manipulating a vehicle ignition switch.

5. A method according to claim 1 wherein the step of delivering lubricant comprises opening a solenoid valve.

6. A method according to claim 5 wherein the step of opening a solenoid valve comprises admitting high pressure air to a pumping unit for pumping lubricant from the reservoir to the lubrication points.

7. A method according to claim 6 further comprising amplifying the pressure of the air for delivering lubricant at an elevated pressure. occurrence 8. An automotive vehicle in which lubricant is periodically automatically applied to lubrication points thereof and comprising motive means for moving the vehicle, manually operable means operatively connected to said motive means for controllably enabling and disabling movement of the vehicle and including electrical switch means responsive to such enabling and disabling, counter means electrically connected to said switch means for measuring predetermined intervals of time during which movement of the vehicle is enabled, regardless of the occurence of any such movement, lubricant reservoir means for supplying lubricant, conduit means for establishing operative communication between said reservoir means and lubrication points of the vehicle, and means operatively interposed in said conduit means and connected to said counter means for causing lubricant to flow from said reservoir to the lubrication points after measurement of a predetermined interval of time during which movement of the vehicle was enabled and regardless of the occurrence of any such movement.

9. An automotive vehicle according to claim 8 wherein said manually operable means comprises vehicle handbrake means.

10. An automotive vehicle according to claim 8 wherein said manually operable means comprises vehicle ignition switch means.

11. An automotive vehicle according to claim 8 further comprising high pressure air supply means operatively connected with said means for causing lubricant to flow and for providing motive force for moving lubricant from said reservoir means to the lubrication points.

12. An automotive vehicle according to claim 11 further comprising solenoid valve means operatively interposed between said air supply means and said means for causing lubricant to flow, said solenoid valve means being electrically connected with said counter means and operable thereby for admitting high pressure air to said means for causing lubricant to flow.

13. An automotive vehicle according to claim 12 wherein said means for causing lubricant to flow comprises air operated pump means operatively communicating with said air supply means by way of said solenoid valve means.

14. An automotive vehicle according to claim 13 wherein said pump means comprises a pair of interconnected pistons, one of said pistons having a large surface area and being acted upon by high pressure air while the other of said pistons has a small surface area and acts on lubricant.

15. An automotive vehicle according to claim 14 wherein valve means cooperating with said pistons for enabling lubricant acted on by said other piston to flow to the lubrication points and to enable lubricant to be drawn from said reservoir by said other piston, said valve means including check valve means operatively interposed in said conduit means for blocking return flow of lubricant during admission of high pressure air to said pump means.

16. An automotive vehicle according to claim 8 further comprising valve means at the lubrication points of the vehicle and operatively communicating with said conduit means for preventing lubricant from flowing away from the lubrication points.

17. An automotive vehicle according to claim 16 wherein each of said valve means comprises a lubricant distribution cylinder having a piston therein, said piston being adapted to move in said cylinder when pressurized lubricant is supplied thereto and thereby for urging predetermined quantity of lubricant to the lubrication point.

18. An automotive vehicle according to claim 8 wherein said counter means comprises memory means for storing signals representative of the count on the counter during any period of time during which vehicle movement is disabled, whereby said counter means resumes counting from the stored count upon vehicle movement subsequently being again enabled.

19. An automotive vehicle according to claim 8 wherein said counter means comprises re-set means for resetting the counter means to zero upon completion of measurement of a predetermined interval of time.

* * * * *

UNITED STATES PATENT AND TRADEMARK OFFICE
CERTIFICATE OF CORRECTION

PATENT NO. : 3,985,205
DATED : October 12, 1976
INVENTOR(S) : Bo Pauls Sigvald Hedlund et al It is certified that error appears in the above-identified patent and that said Letters Patent are hereby corrected as shown below:

Column 3, Line 30, after "is", omit "n", insert - an -;

Column 6, Line 46, after "during" insert - which -;

Column 6, Line 68, after "pressure." omit - occurrence -.

Signed and Sealed this

First Day of February 1977

[SEAL]

Attest:

RUTH C. MASON
Attesting Officer

C. MARSHALL DANN
Commissioner of Patents and Trademarks